United States Patent
Hasenzahl et al.

[11] Patent Number: 6,106,803
[45] Date of Patent: Aug. 22, 2000

[54] GRANULATES WHICH CONTAIN TITANIUM SILICALITE-1

[75] Inventors: Steffen Hasenzahl, Hanau; Georg Markowz, Karlstein; Mathias Viandt, Mainz, all of Germany; Eckehart E. Roland, Hartsdale, N.Y.; Georg Thiele; Gustaaf Goor, both of Hanau, Germany; Alexander Möller, Gelnhausen, Germany

[73] Assignee: Degussa-Huls AG, Frankfurt am Main, Germany

[21] Appl. No.: 09/121,309

[22] Filed: Jul. 23, 1998

[30] Foreign Application Priority Data

Jul. 23, 1997 [DE] Germany .............. 197 31 627

[51] Int. Cl.[7] ............ C01B 34/08; C01B 39/36; B01J 29/30; B01J 29/40; C07D 301/12
[52] U.S. Cl. .......... 423/705; 423/713; 423/716; 423/DIG. 22; 423/326; 502/64; 502/242; 549/531; 564/267; 568/311; 568/385
[58] Field of Search .......... 502/64, 242; 423/705, 423/713, 716, DIG. 22, 326; 549/326, 531; 564/267; 568/385, 311

[56] References Cited

U.S. PATENT DOCUMENTS

| | | | |
|---|---|---|---|
| 4,088,605 | 5/1978 | Rollmann | 423/DIG. 22 |
| 4,410,501 | 10/1983 | Taramasso et al. | 423/DIG. 22 |
| 5,041,652 | 8/1991 | Padovan et al. | 564/267 |
| 5,466,835 | 11/1995 | Nemeth et al. | 502/242 |
| 5,525,563 | 6/1996 | Thiele et al. | 502/69 |
| 5,683,952 | 11/1997 | Onozawa et al. | 423/713 |
| 5,736,479 | 4/1998 | Schodel et al. | 502/77 |
| 5,869,706 | 2/1999 | Dartt et al. | 423/713 |

FOREIGN PATENT DOCUMENTS

| | | |
|---|---|---|
| 0200260B1 | 5/1990 | European Pat. Off. |
| 0265018B1 | 12/1992 | European Pat. Off. |
| 4240693A1 | 6/1994 | Germany |
| 19623972A1 | 12/1997 | Germany |

OTHER PUBLICATIONS

Meier et al., Atlas of Zeolite Structure Types, 1992, pp. 138, 139, 192, and 193.

*Primary Examiner*—Mark L. Bell
*Assistant Examiner*—David Sample
*Attorney, Agent, or Firm*—Pillsbury Madison & Sutro LLP

[57] ABSTRACT

Granulates which contain titanium silicalite-1 are composed of silicon dioxide, titanium dioxide and titanium silicalite-1 crystals. The granulates can be prepared by spray-drying or spray granulating the crystallization suspension. The granulates may be used as suspension catalysts, such as for the epoxidation of olefins using hydrogen peroxide.

16 Claims, 10 Drawing Sheets

GRANULATES WHICH CONTAIN TITANIUM SILICALITE-1

CROSS-REFERENCE TO RELATED APPLICATION

This application claims priority from German Application No. 19731627.1, filed Jul. 23, 1997, the subject matter of which is incorporated herein by reference.

FIELD OF THE INVENTION

The invention relates to granulates which contain titanium silicalite-1, a process for their preparation and their use as a catalyst.

BACKGROUND OF THE INVENTION

Titanium silicalite-1 is known from U.S. Pat. No. 4,410,501. It is an efficient catalyst for the oxidation of organic substrates with hydrogen peroxide such as, for example, the epoxidation of olefins (EP 1 100 119), the ammoximation of carbonyl compounds (EP 0 267 362) and the hydroxylation of aromatic compounds (U.S. Pat. No. 4,396,783). The catalytic activity of different titanium silicalite-1 samples depends on the size of the primary crystals as well as the titanium content (A.J.H.P. van der Pol, Appl. Cat. A92 (1992) 113). Thus a decrease in catalytic activity with increasing size of the primary crystals is observed.

In order to produce the highest possible catalytic activity in the liquid phase, it is therefore advantageous to use titanium silicalite-1 with small primary crystals. On the other hand the separation of small solid particles from a liquid when the diameters have values of a few micrometers or less is relatively costly on an industrial scale. Isolation and thus possible recovery of catalyst particles is desirable due to the high cost of manufacture and their inherent value.

It is known that titanium silicalite-1 can be agglomerated in order to improve the solid/liquid separation procedure.

A process for agglomerating titanium silicalite-1 and for preparing a titanium silicalite-1 granulate is described in EP-A 0 200 260, EP-A 0 265 018 and U.S. Pat. No. 5,500,199. Here an aqueous solution of oligomeric silicon dioxide and tetra-n-propylammonium hydroxide is first prepared by hydrolyzing a tetraalkylorthosilicate with an aqueous solution of tetra-n-propylammonium hydroxide. The titanium silicalite-1 crystals are suspended in this solution and the suspensions obtained are then spray-dried. Spherical agglomerates with a diameter of 5 to 1000 $\mu$m should be produced using this process. They are composed of titanium silicalite-1 crystals and oligomeric silicon dioxide, wherein zeolite crystals should be "entrapped by means of Si—O—Si bonds". Silicon dioxide sources other than tetraalkylorthosilicates, such as colloidal silicon dioxide or sodium silicates lead to products of lower quality (EP-A 0 200 260). A molar ratio of oligomeric silicon dioxide to titanium silicalite-1 of 0.05 to 0.11 is cited for the composition of the catalyst in EP-A 0 200 260. A ratio by weight of oligomeric silicon dioxide to titanium silicalite-1 of 5:95 to 20:80 is cited in EP-A 0 265 018 and U.S. Pat. No. 5,500,199, corresponding to a $SiO_2$ concentration of 5 to 20 wt. %.

Figure 1A:
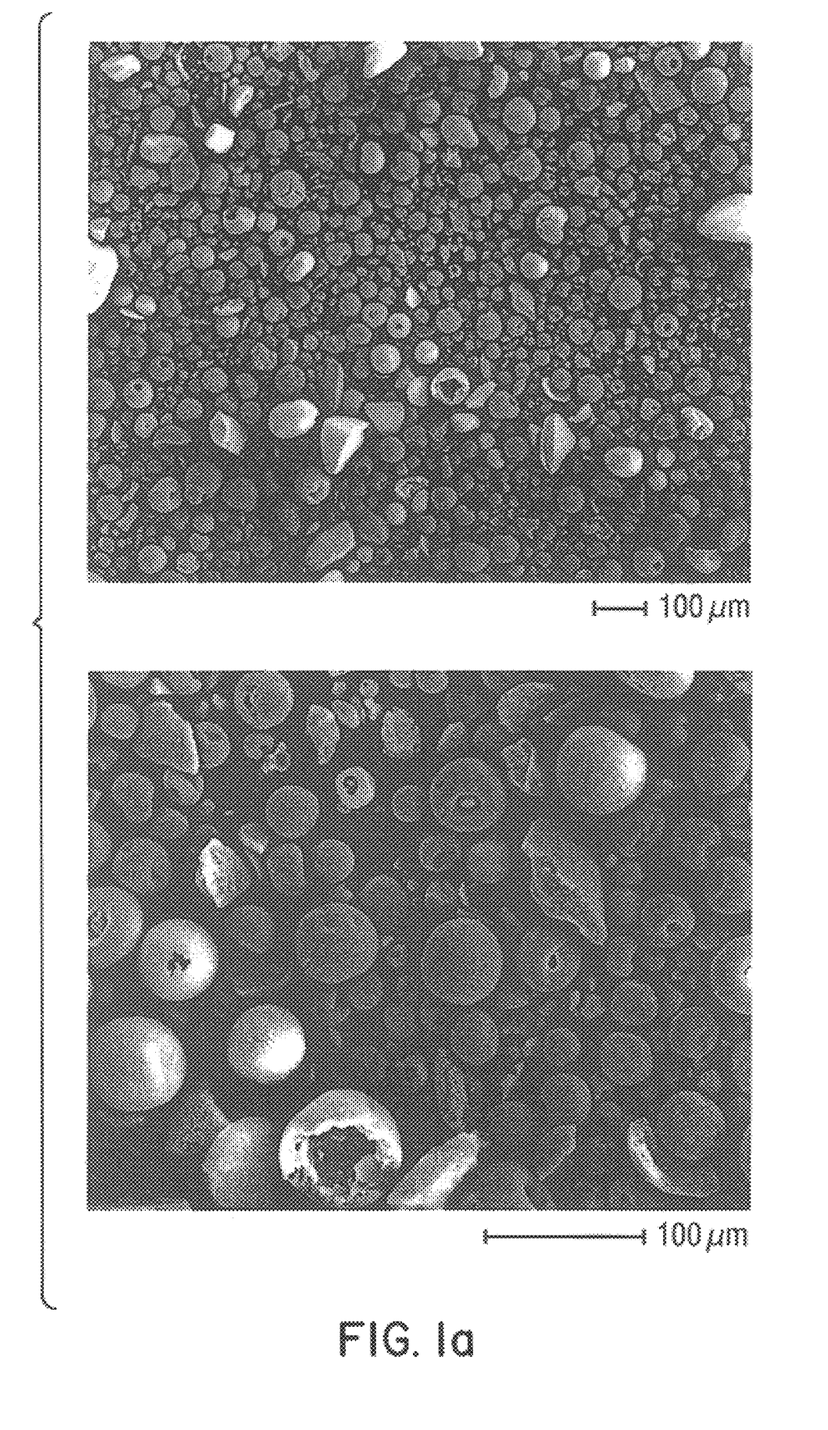
FIGS. 1a and 1b show the titanium silicalite-1 spray granulate in accordance with Example 1.
Figure 1B:
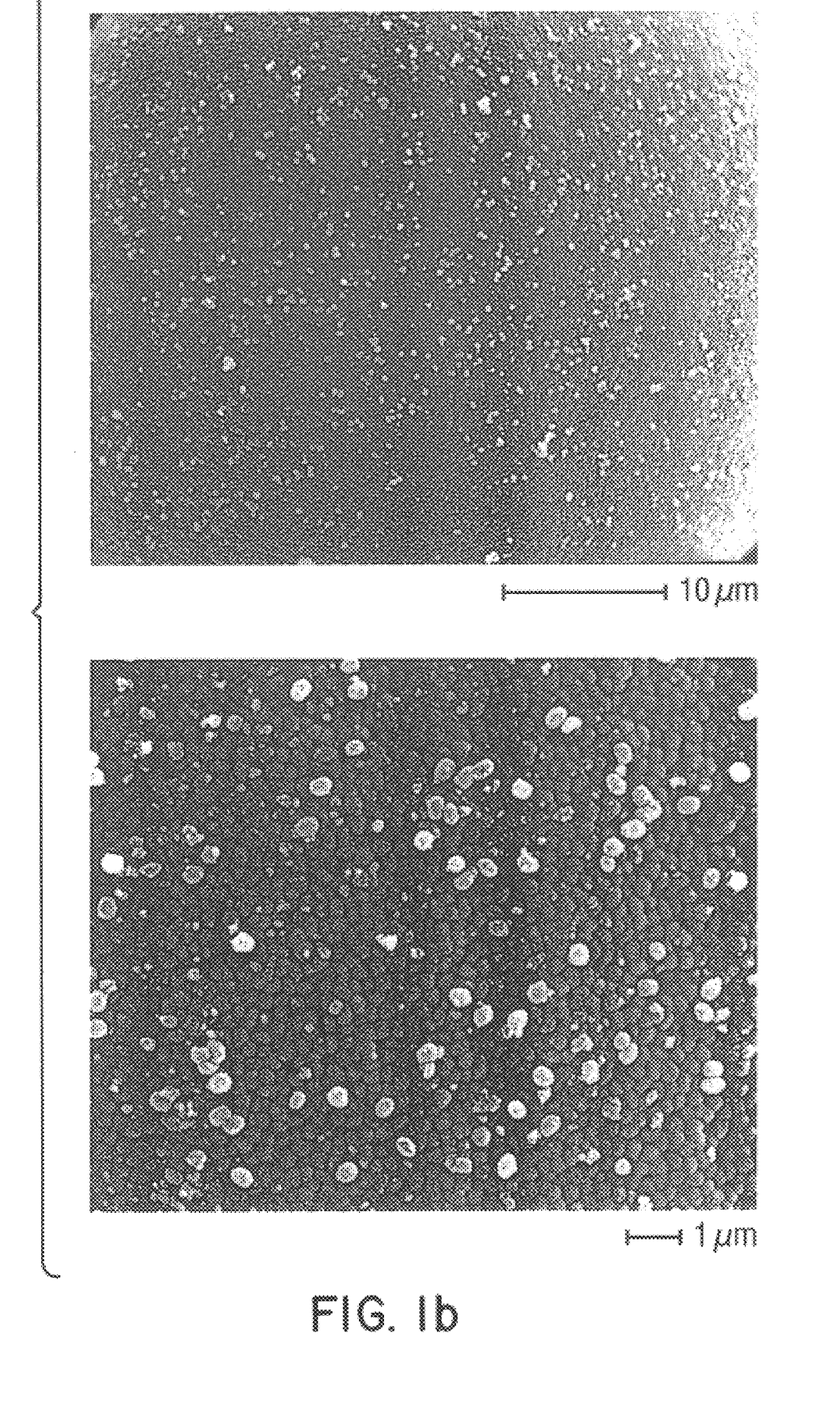

Titanium silicalite-1 granulates prepared in accordance with known processes have serious disadvantages. Thus, titanium silicalite-1 granulates prepared in accordance with U.S. Pat. No. 5,500,199, Example 8 (see Example 1 in this application) exhibit much lower activity in oxidation reactions with hydrogen peroxide, such as for example the epoxidation of propene, than non-granulated titanium silicalite-1 powder (see Example 2 in this application). It can be seen from the SEM photographs of this material (see FIG. 1) that the agglomerated titanium silicalite-1 crystals are coated with a relatively compact catalytically inactive layer. This means that the reactants have restricted access to the catalyst crystals. The result is reduced catalytic activity. In addition a large proportion of the agglomerates is in the form of bowl-shaped or spherical fragments. Considerably increased mechanical abrasion takes place at any edges on the fragments.

The known process for preparing titanium silicalite-1 granulates also has a number of disadvantages:

Separation of the titanium silicalite-1 crystals formed during crystallization from the mother liquor is very costly due to their small average size of less than one micrometer.

The mother liquor contains residues of unreacted tetrapropylammonium hydroxide that must be disposed of. This is associated with high costs.

In order to produce the suspension of "oligomeric silicon dioxide" acting as binder, additional amounts of the expensive raw materials tetraethylorthosilicate and tetrapropylammonium hydroxide are required.

SUMMARY OF THE INVENTION

The object of the invention is to provide granulates which contain titanium silicalite-1 and do not have the disadvantages of known granulates, and also to provide a simple and economically viable process for preparing granulates containing titanium silicalite-1.

The invention provides granulates which contain titanium silicalite-1, which are characterized in that they are composed of titanium silicalite-1 crystals, silicon dioxide and titanium dioxide.

The concentration of silicon dioxide may be 1 to 50 wt. %, preferably 1 to 20 wt. % and the concentration of titanium dioxide is 0.01 to 5 wt. %, preferably 0.05 to 1 wt. %. Both the silicon dioxide and the titanium dioxide may be either amorphous or crystalline.

In one embodiment of the invention the granulates which contain titanium silicalite-1 are prepared by means of spray-drying.

Titanium silicalite-1 granulates prepared by spray-drying are composed of titanium silicalite-1 crystals, silicon dioxide and titanium dioxide, wherein the concentration of silicon dioxide may be between 1 and 5 wt. % and the concentration of titanium dioxide may be between 0.05 and 1 wt. %. Granulates prepared by means of spray-drying have a diameter between 5 and 300 $\mu$m and some of them may be hollow.

In another embodiment, granulates according to the invention are prepared using fluidized-bed spray granulation drying.

Titanium silicalite-1 granulates prepared by fluidized-bed spray granulation drying are composed of titanium silicalite-1 crystals, silicon dioxide and titanium dioxide, wherein the concentration of $SiO_2$ may be between 1 and 20 wt. % and the concentration of $TiO_2$ may be between 0.05 and 1 wt. %. Granulates prepared by fluidized-bed spray granulation drying may have a diameter of 5 to 500 $\mu$m and are largely dense.

The invention also provides a process for preparing granulates which contain titanium silicalite-1, which is characterized in that a synthesis gel which contains a $SiO_2$ source, a TiO$_2$ source, a compound which contains tetra-n-propylammonium ions, a base and water, is crystallized under hydrothermal conditions, the titanium silicalite-1 suspension produced in this way, optionally after concentrating and/or adding other substances, is subjected to spray-drying or fluidized-bed spray granulation drying and the titanium silicalite-1 granulate obtained in this way is calcined at a temperature between 400 and 1000° C., preferably between 500 and 750° C.

BRIEF DESCRIPTION OF THE DRAWINGS

The SEM (scanning electron microscope) photographs of the granulates prepared in accordance with the Examples are shown in the Figures, wherein.

DETAILED DESCRIPTION OF THE INVENTION

The following may be used as raw materials for preparing the synthesis gel from which titanium silicalite-1 is crystallized under hydrothermal conditions:

tetraalkylorthosilicate (U.S. Pat. No. 4,410,501; DE-A 196 23 972.9), Aerosil (DE-A 196 23 972.9) as a source of SiO$_2$;

tetraalkylorthotitanate (U.S. Pat. No. 4,410,501; DE-A 196 41 782.1), titanium(III) chloride (Gao, J. Chem. Soc., Chem. Commun. 1995, 835; DE-A 196 23 972.9), titanium(IV) fluoride (Tuel, EP 0 665 188), titanium (IV) oxychloride (EP 0 200 260) as a source of TiO$_2$;

SiO$_2$/TiO$_2$ coprecipitates (EP 0 311 983), pyrogenic Si/Ti mixed oxides (DE-A 196 24 340.8) as combined SiO$_2$ and TiO$_2$ sources;

tetra-n-propylammonium hydroxide (U.S. Pat. No. 4,410,501), tetra-n-propylammonium bromide (Müller, stud. Surf. Sci. Catal. 84 (1994) 203) as template;

tetra-n-propylammonium hydroxide (U.S. Pat. No. 4,410,501), ammonia (Müller, stud. Surf. Sci. Catal. 84 (1994) 203), 1,6-diaminohexane (Tuel, Zeolites 16 (1996) 108) as a base.

When preparing the synthesis gel a SiO$_2$ source, a TiO$_2$ source, a compound containing tetra-n-propylammonium ions and a base may be dissolved or suspended or reacted in water, wherein this step may be performed at a temperature between −10° C. and 100° C., preferably however between 0 and 60° C. The alcohols which are released when using tetraalkylorthosilicates and/or tetraalkylorthotitanates may then be removed by distillation. After an optionally-performed aging process for the gel, crystallization is performed at a temperature between 100 and 200° C., preferably between 160 and 185° C., under the self-generated pressure. The crystallization time may be between 1 hour and 10 days, preferably between 1 and 24 hours.

In a preferred embodiment of the process according to the invention the solids content of the titanium silicalite-1 suspension may be increased before spray-drying or fluidized-bed spray granulation drying. For this purpose, for example, the titanium silicalite-1 suspension is divided, after crystallization and the solid is separated from one portion of the suspension by cake-forming filtration, centrifuging or another suitable process. The filter cake or the sediment may then be suspended in the remaining portion of the titanium silicalite-1 suspension, optionally after a washing stage. In order to facilitate separation of the solid, a suitable flocculating aid, such as e.g. PRAESTOL™ 187 K (Stockhausen GmbH & Co. KG), or acids, such as e.g. hydrochloric acid or acetic acid, may be added to the titanium silicalite-1 suspension. The solids content of the titanium silicalite-1 suspension may also be increased by evaporation, preferably under reduced pressure, or by cross-flow filtration.

The titanium silicalite-1 suspension used for spray-drying or fluidized-bed spray granulation drying, which may optionally be concentrated using one of the processes described above may have a solids content between 5 and 600 g/l, preferably between 100 and 500 g/l, wherein the solids content refers to the material calcined at 550° C. The concentration of dissolved silicates may be between 0.05 and 150 g/l, preferably between 5 and 60 g/l, and the pH may be greater than 7.0. The suspension may also contain between 0.05 and 15 g/l of dissolved titanates. Binders or pore producers such as, for example, tetraalkylorthosilicate, silica sol, pyrogenic silica (Aerosil), tetra-n-propylammonium hydroxide, tylose, pentaerythritol, etc., may also be added to the titanium silicalite-1 suspension.

Suitable methods for preparing titanium silicalite-1 granulates according to the invention from suspensions include in particular spray-drying (R. Herbener, Chem.-Ing.-Tech. 59 (1987) 112) and fluidized-bed spray granulation drying, which may optionally be performed continuously (H. Uhlemann, Chem.-Ing.-Tech. 62 (1990) 822). Evaporation of the suspension liquid and a shaping procedure in a process step which uses intensive heat and material exchange are common to both these methods. The energy input required for evaporation is supplied each time by a hot stream of air or inert gas.

In the process according to the invention, the titanium silicalite-1 suspension formed by hydrothermal synthesis, preferably after concentrating the solid may be sprayed into droplets. Natural or colloidally-dissolved silicates and titanates contained in the solution act as binders. The titanium silicalite-1 crystals are present in a reactive form because their surface is rich in Si—OH groups. This encourages the production of stable chemical bonds with silicates and titanates after eliminating water.

During spray-drying, the suspension is first broken down into fine droplets which are then fluidized and dried in a drying gas stream. The spheres produced during the drying procedure are often hollow because solidification of the particles takes place from the outside to the inside. The particle dimensions vary, in particular with the size of spray droplets formed and the proportion of solids in the suspension. Suitable atomizing devices are, for example, single-fluid pressure nozzles, two-fluid atomization nozzles or rotary atomizers. The inlet temperature of the carrier gas may be between 200 and 700° C., preferably between 300 and 500° C.; the exit temperature of the carrier gas may be between 50 and 200° C., preferably between 90 and 160° C. The drying gas and the droplets being spray-dried may be passed in the same or opposite directions.

During fluidized-bed spray granulation drying, which may also be operated in a continuous manner, the spray droplets produced are introduced into a fluidized bed consisting of already largely dried particles. When a spray droplet encounters a particle, the liquid and with it the suspended and/or dissolved solids are distributed over the surface of the particle. Then the liquid from the droplet evaporates and a thin layer of solid remains on the surface. The particles in the fluidized-bed are built up in shells by a number of repetitions of these processes. Differently from during spray-drying, particles built up on solid nuclei by means of fluidized-bed spray granulation drying form compact solids. Titanium silicalite-1 granulates, preferably prepared by the process according to the invention, which have first been milled to a suitable particle size may be used as nuclei. Other materials such as e.g. $SiO_2$, $Al_2O_3$, $TiO_2$, $ZrO_2$ or corresponding mixed oxides and mixtures of these substances, aluminas and natural silicates, zeolites such as e.g. ZSM-5, de-aluminized Y-zeolite etc., may also be used as nuclei. The inlet and outlet temperatures of the drying gas are in the same ranges as given above for spray drying.

Granulates obtained by one of the drying processes according to the invention may then be calcined at a temperature of between 400 and 1000° C., preferably between 500 and 750° C. Calcination may be performed in an inert gas, preferably in a nitrogen atmosphere or in air. In a preferred embodiment, the granulates may first be calcined in a nitrogen atmosphere. This atmosphere may then be changed gradually to air. The mechanical stability of the titanium silicalite-1 granulates in the preferred temperature between 500 and 750° C. increases with increasing temperature, while the catalytic activity is not impaired.

Titanium silicalite-1 granulates according to the invention consist of titanium silicalite-1 crystals, silicon dioxide and titanium dioxide. The silicon dioxide and titanium dioxide, both of which may be either amorphous or in the crystalline form, act as a binder between the titanium silicalite-1 crystals. Silicon dioxide and titanium dioxide are produced during the granulation process and the subsequent calcination step from silicates and titanates which are dissolved or present in colloidal form in the titanium silicalite-1 suspension. The composition of the titanium silicalite-1 granulates can easily be calculated from a knowledge of the composition of the titanium silicalite-1 suspension used for granulation. If materials other than titanium silicalite-1 are used as nuclei for the titanium silicalite-1 granulates prepared by fluidized-bed spray granulation drying, then the granulates may contain other elements such as, for example, aluminum, zirconium, alkali metals or alkaline-earth metals.

The diameter of titanium silicalite-1 granulates according to the invention is between 5 and 500 $\mu$m. Granulates prepared by spray-drying may sometimes be hollow, whereas granulates prepared by fluidized-bed spray granulation drying are largely dense. Granulates according to the invention are also characterized by their low concentration of silicon dioxide and titanium dioxide (less than 5 wt. %), and by high mechanical stability. Thus the SEM photographs of titanium silicalite-1 granules according to the invention (FIGS. 2, 4 and 6) show largely intact agglomerates, whereas mostly severely damaged agglomerates are observed in granulates prepared using the prior art (FIG. 1). Granulates which consist of thick-walled or solid agglomerates are particularly mechanically stable. As a result of the low solubility of titanium dioxide in water, as compared with silicon dioxide, the stability of titanium silicalite-1 granulates according to the invention in aqueous reaction media is much higher than that of granulates from the prior art in which only oligomeric silicon dioxide acts as a binder. In contradiction to the literature (see e.g. Notari, Advances in Catalysis, 41 (1995) 253), we have not observed any dis-advantageous effect of titanium dioxide on the catalytic activity of titanium silicalite-1 granulates.

Titanium silicalite-1 granulates according to the invention have a high catalytic activity. The reason for this is that the agglomerated titanium silicalite-1 crystals are coated by only a thin layer of catalytically inactive silicon dioxide and titanium dioxide, as can be seen on the SEM photographs of these materials. If the granulates contain less than 5 wt. % of silicon dioxide and titanium dioxide, then the SEM photographs show that hardly any layers of this type can be detected on the titanium silicalite-1 crystals. Differently from the granulates according to the prior art, in the granulates according to the invention the accessibility of the reactants to the titanium silicalite-1 crystals is not reduced or is reduced only very slightly.

Titanium silicalite-1 granulates according to the invention are suitable in particular as suspension catalysts. They may be used, for example, for the epoxidation of olefins using hydrogen peroxide, preferably the epoxidation of propene using hydrogen peroxide, the hydroxylation of aromatic compounds using hydrogen peroxide, the ammoximation of carbonyl compounds using hydrogen peroxide and ammonia and for the oxidation of secondary alcohols to ketones using hydrogen peroxide.

The process according to the invention for preparing titanium silicalite-1 granulates has the advantage as compared with the prior art, that isolation of the titanium silicalite-1 crystals from the suspension formed during hydrothermal synthesis, for example by filtration or centrifuging, is not necessary. In addition a mother liquor which still contains residues of unreacted tetra-n-propylammonium hydroxide is not produced. Costly waste disposal procedures are therefore no longer required. Furthermore, the following process steps are not required: the preparation of a solution of oligomeric silicon dioxide and tetra-n-propylammonium hydroxide from tetraalkylorthosilicate and an aqueous solution of tetra-n-propylammonium hydroxide followed by the suspension of the titanium silicalite-1 powder in this solution. In addition no additional tetraethylorthosilicate and tetrapropylammonium hydroxide are consumed in the granulation step. For these reasons the process according to the invention is considerably simpler, more efficient and more cost effective.

EXAMPLES

Example 1

Preparing a titanium silicalite-1 spray granulate (comparative example)

A titanium silicalite-1 spray granulate is prepared as described in U.S. Pat. No. 5,500,199, Example 8:

111.2 g of tetraethylorthosilicate are added to 35.6 g of a tetrapropylamnonium hydroxide solution (40 wt. %) and 83.1 g of deionized water with vigorous stirring in a glass beaker. This mixture is stirred for 1 hour at 60° C. After adding 487.0 g of deionized water, the mixture is stirred for a further hour. 300 g of a titanium silicalite-1 powder (chemical composition: 97.2 wt. % $SiO_2$ and 2.7 wt. % $TiO_2$) which has been centrifuged, washed and calcined at 550° C. are dispersed in the clear solution. The titanium silicalite-1 suspension prepared in this way is dried in a spray-drier (NIRO atomizer model 1638; inlet temperature 380° C.; outlet temperature 103° C., speed of rotation of the atomizing disc 16000 $min^{-1}$). The solid obtained is calcined at 550° C. for 2 hours in nitrogen and then for 2 hours in air. The yield is 259.2 g, wherein the loss due to caking at the walls of the spray-drier and discharge point are not taken into account.

The chemical composition of the product obtained in this way is 97.4 wt. % $SiO_2$ and 2.65 wt. % $TiO_2$.

The composition of the TS-1 granulate obtained in this way can be calculated from the amounts of titanium silicalite-1 and tetraethylorthosilicate (TEOS) used:

| | |
|---|---|
| Concentration of titanium silicalite-1 | 90.3 wt. % |
| Concentration of silicon dioxide | 9.7 wt. % |

The theoretical chemical composition of the granulate can be calculated from these figures:

$$SiO_2 \text{ conc.} = [m(SiO_2) + m(TS-1) \times y(SiO_2)]/m(SiO_2) + m(TS-1)]$$
$$= 32.1g + (300.0g \times 0.972)]/[(32.1 + 300.0g)]$$
$$= 97.47\%$$

$$TiO_2 \text{ conc.} = [m(TS-1) \times y(TiO_2)]/[m(SiO_2) + m(TS-1)]$$
$$= (300.0g \times 0.027)/(32.1 + 300.0g)$$
$$= 2.44\%$$

where:
- $m(SiO_2)$=weight of oligomeric $SiO_2$ in g, formed by hydrolysis of TEOS,
- m(TS-1)=weight of titanium silicalite-1 in g,
- $y(SiO_2)$=$SiO_2$ content of the titanium silicalite-1 powder as wt. %,
- $y(TiO_2)$=$TiO_2$ content of the titanium silicalite-1 powder as wt. %.

The theoretical values calculated in this way agree very well with the experimentally determined values.

The scanning electron microscope photograph of the titanium silicalite-1 spray granulate (FIG. 1) shows that this consists of hollow spheres with a diameter of 10 to 75 μm, of which a considerable proportion are fractured. At 10,000× magnification it can be seen that titanium silicalite-1 crystals with a diameter of about 0.3 μm are coated with a solid, amorphous layer.

Example 2
Application Example; the epoxidation of propylene using hydrogen peroxide 10 g of the titanium silicalite-1 granulate prepared in accordance with Example 1 are reacted at 80° C. for 2 hours with 100 ml of a 1.0 N ammonium acetate solution, then washed with deionized water, dried and calcined for 5 hours at 550° C. in air. 1.0 g of the material treated in this way in 300 ml of methanol is initially introduced into a laboratory autoclave with a gas stirrer, thermostatted at 40° C., under a propylene atmosphere and the solvent is saturated with propylene at an excess pressure of 3 bar. Then 13.1 g of 30 wt. % aqueous hydrogen peroxide solution are added in one portion with stirring and the reaction mixture is maintained at 40° C. and 3 bar, wherein propylene is added via a pressure regulator in order to compensate for the material consumed during reaction. Samples are withdrawn at regular intervals via a filter and the hydrogen peroxide concentration of the reaction mixture is determined by redox titration with Cerium(IV) sulphate solution. The plot of $l_n(c/c_o)$ against time t, where c is the concentration of $H_2O_2$ measured at time t and $c_o$ is the calculated $H_2O_2$ concentration at the start of reaction, gives a straight line. From the slope the straight line and using the equation $dc/dt=k.c.c_{cat}$, where $c_{cat}$ represents the catalyst concentration in kg of catalyst per kg of reaction mixture, the activity index k is determined as 26.0 $min^{-1}$.

In a second experiment the activity index of the unshaped titanium silicalite-1 powder prepared in accordance with Example 1 is determined. This is 31.3 $min^{-1}$. The loss in activity due to granulation is thus 17.0%.

Example 3
Preparing a titanium silicalite-1 spray granulate

A gel for the synthesis of titanium silicalite-1 is prepared in the same way as described in U.S. Pat. No. 4,410,501, Example 1, and is crystallized for 3 hours at 175° C. under the self-generated pressure. The suspension obtained after hydrothermal synthesis is divided.

The solids are separated from 3.0 l of this suspension by centrifuging, washed with deionized water, dried overnight at 105° C. and calcined in air for 5 hours at 550° C. The yield of titanium silicalite-1 is 334.7 g, corresponding to a solids content in suspension of 111.6 g/l. The chemical composition of the product is 2.7 wt. % $TiO_2$ and 97.3 wt. % $SiO_2$. In order to determine the concentration of dissolved $SiO_2$ and $TiO_2$ in the mother liquor, the still slightly cloudy centrifugate is filtered through a 0.2 μm membrane filter. Subsequent analysis of the filtrate gives a $SiO_2$ content of 12.8 g/l and a $TiO_2$ content of 0.70 g/l.

Another 3 liters of the titanium silicalite-1 suspension mentioned above are dried in a spray-drier (NIRO atomizer model 1638; inlet temperature 380° C.; outlet temperature 95–98° C.; speed of rotation of the atomizing disc 13,000–14,800 $min^{-1}$). The solid obtained is calcined at 550° C., firstly for 2 hours in a nitrogen atmosphere and then for 2 hours in air. The yield of solid is 259.2 g, wherein the loss due to caking at the walls of the spray-drier or the discharge point is not taken into account. The chemical composition of the product prepared in this way is 97.0 wt. % $SiO_2$ and 2.95 wt. % $TiO_2$.

The composition of the titanium silicalite-1 spray granulate prepared in this way is calculated from the solids content and the concentration of dissolved $SiO_2$ and $TiO_2$ in the titanium silicalite-1 suspension used for spray-drying:

| | |
|---|---|
| concentration of titanium silicalite-1: | 89.2 wt. % |
| concentration of silicon dioxide: | 10.2 wt. % |
| concentration of titanium dioxide: | 0.6 wt. %. |

The theoretical chemical composition of the titanium silicalite-1 granulate can be calculated in the following way:

$$SiO_2 \text{ conc.} = [m(SiO_2) + m(TS-1) \times y(SiO_2)]/m(SiO_2) + m(TS-1)]$$
$$= [38.4g + (334.7g \times 0.972)]/(38.4 + 334.7g)$$
$$= 96.94\%$$

$$TiO_2 \text{ conc.} = [m(TiO_2) \times m(TS-1) \times y(TiO_2)]/[m(SiO_2) + m(TiO_2) + m(TS-1)]$$
$$= [2.1g + (334.7g \times 0.027)]/(38.4g + 2.1g + 334.7g)$$
$$= 2.97\%$$

where:
- $m(SiO_2)$=weight of $SiO_2$ in g,
- $m(TiO_2)$=weight of $TiO_2$ in g,
- m(TS-1)=weight of titanium silicalite-1 in g,
- $y(SiO_2)$=$SiO_2$ content of the titanium silicalite-1 powder as wt. %,
- $y(TiO_2)$=$TiO_2$ content of the titanium silicalite-1 powder as wt. %.

The theoretical values agree very well with the experimentally-determined values.

Figure 2A:
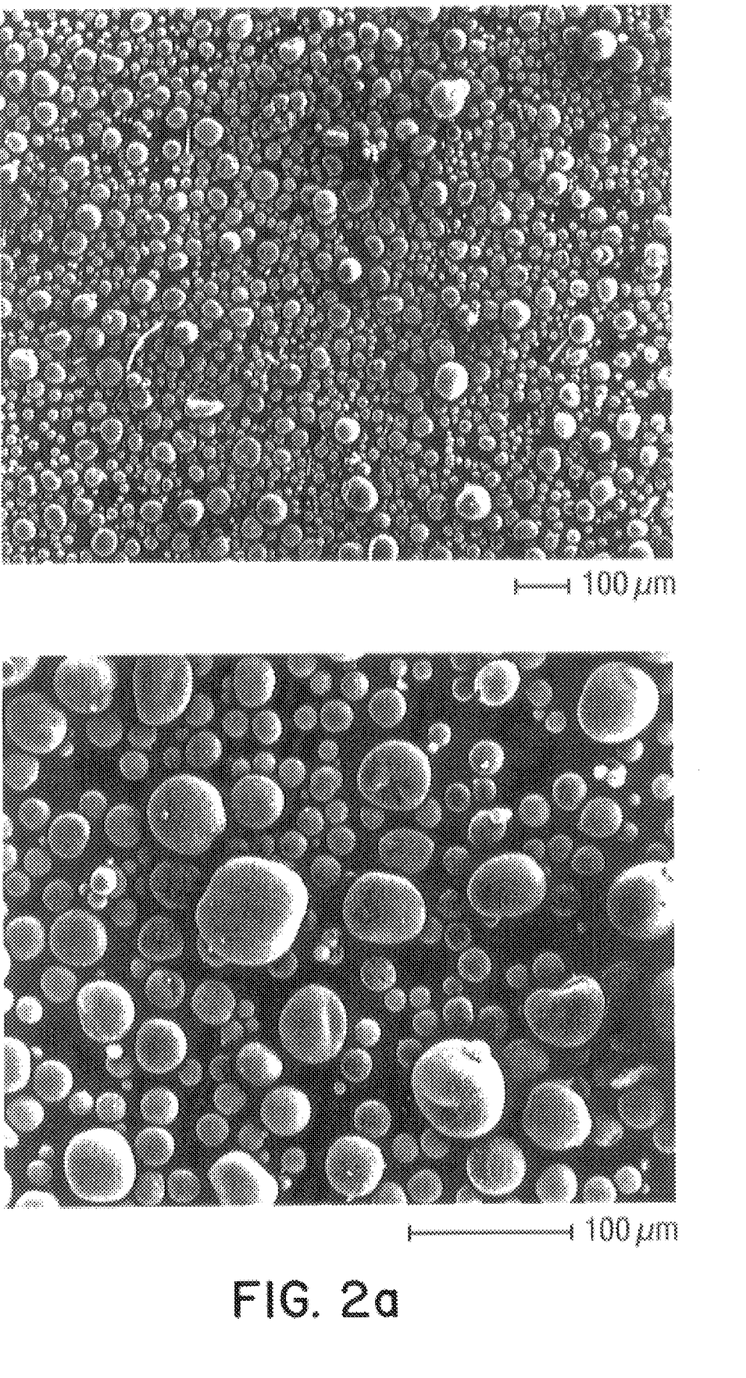
FIGS. 2a and 2b show the titanium silicalite-1 spray granulate in accordance with Example 3.
Figure 2B:
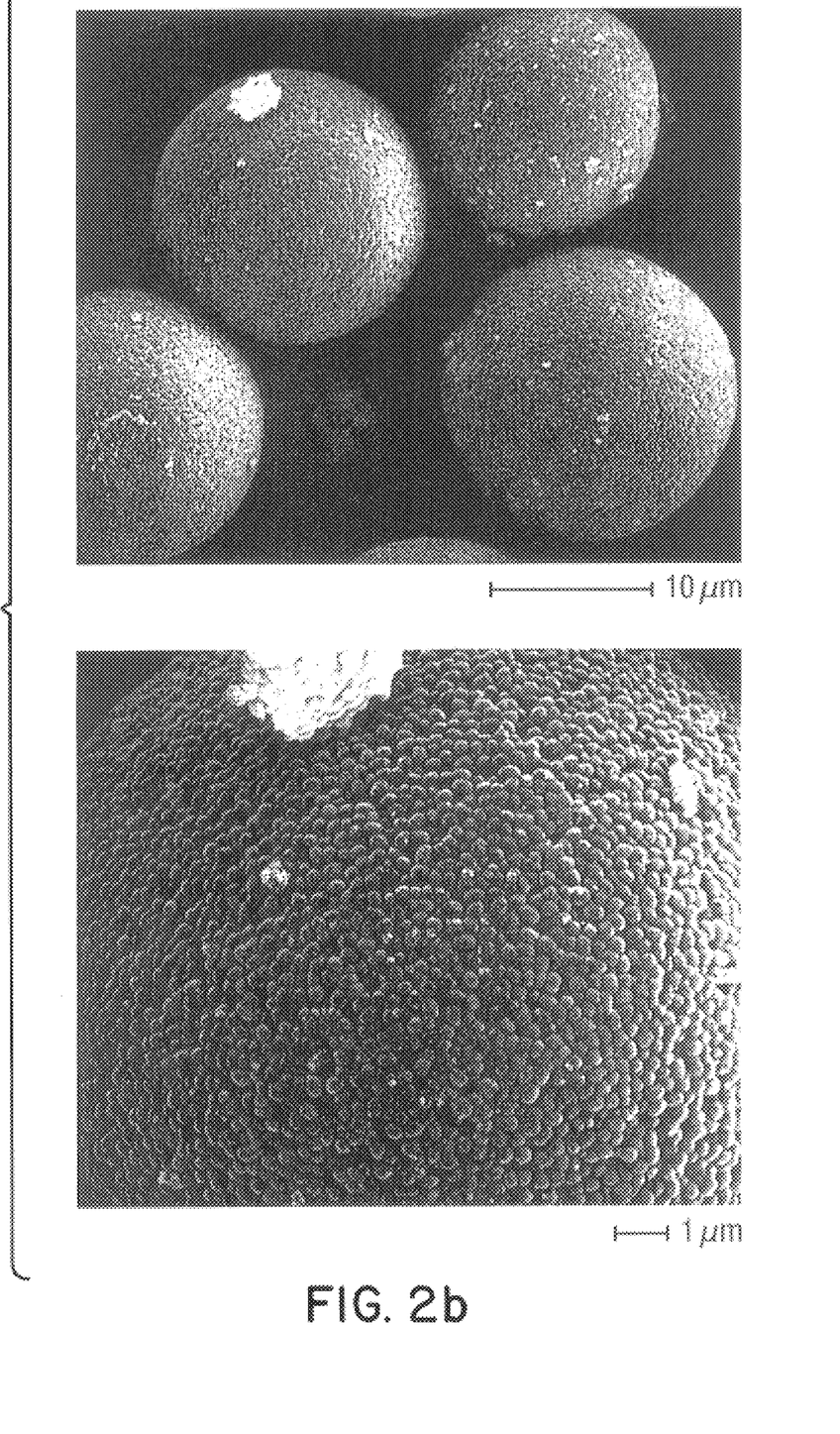
Figure 3:
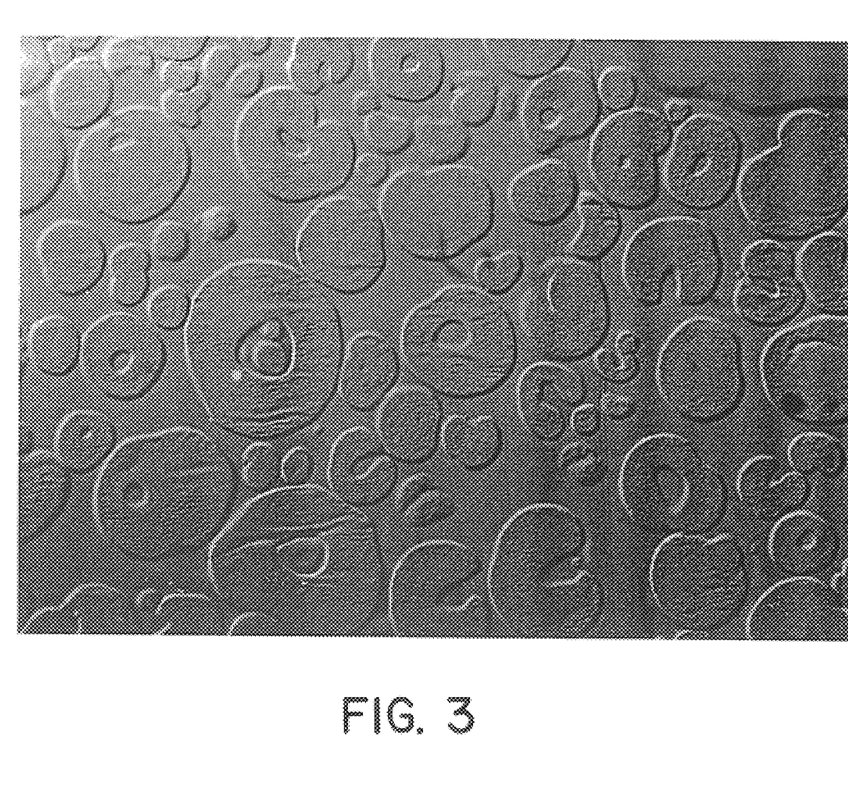
FIG. 3 shows a thin section photograph of the titanium silicalite-1 spray granulate in accordance with Example 3.

The scanning electron microscope photograph of the titanium silicalite-1 spray granulate (FIG. 2) shows that this consists of largely spherical agglomerates with a diameter of 5 to 60 µm. Only a small proportion of the agglomerates is not intact. At 10,000× magnification, it can be seen that titanium silicalite-1 crystals with a diameter of about 0.3 µm are coated by a thin amorphous layer. A thin section photograph (FIG. 3) shows that most of the particles are hollow.

Example 4
Application Example; the epoxidation of propylene with hydrogen peroxide Example 2 is performed using the titanium silicalite-1 granulate prepared in accordance with Example 3. The activity index is 30.9 min$^{-1}$. In a second experiment the activity index of the unshaped titanium silicalite-1 powder prepared in Example 3 is determined. This is 31.3 min$^{-1}$. The loss in activity due to granulation is therefore 1.3%.

Example 5
Preparing a titanium silicalite-1 spray granulate using an enriched titanium silicalite-1 suspension The solids are separated from 6.0 l of a titanium silicalite-1 suspension prepared in accordance with Example 3 by centrifuging. The still moist filter cake is then suspended in 2.05 l of this titanium silicalite-1 suspension. The concentration of the titanium silicalite-1 in the suspension prepared in this way is determined in the same way as in Example 3 and is 403.6 g/l (with respect to the calcined solids). The $SiO_2$ and $TiO_2$ concentration of the mother liquor filtered through a 0.2 µm membrane filter is 12.6 g/l $SiO_2$ and 0.69 g/l of $TiO_2$. 2.25 liters of the titanium silicalite-1 suspension prepared in this way are dried in a spray-drier and then calcined in the same way as described in Example 3.

The chemical composition of the product prepared in this way is 97.1 wt. % $SiO_2$ and 2.83 wt. % $TiO_2$. The composition of the titanium silicalite-1 spray granulate prepared therefrom is calculated from the solids content and from the concentration of dissolved $SiO_2$ in the titanium silicalite-1 suspension used for spray-drying:

| | |
|---|---|
| concentration of titanium silicalite-1: | 96.8 wt. % |
| concentration of silicon dioxide: | 3.0 wt. % |
| concentration of titanium dioxide: | 0.2 wt. %. |

Figure 4A:
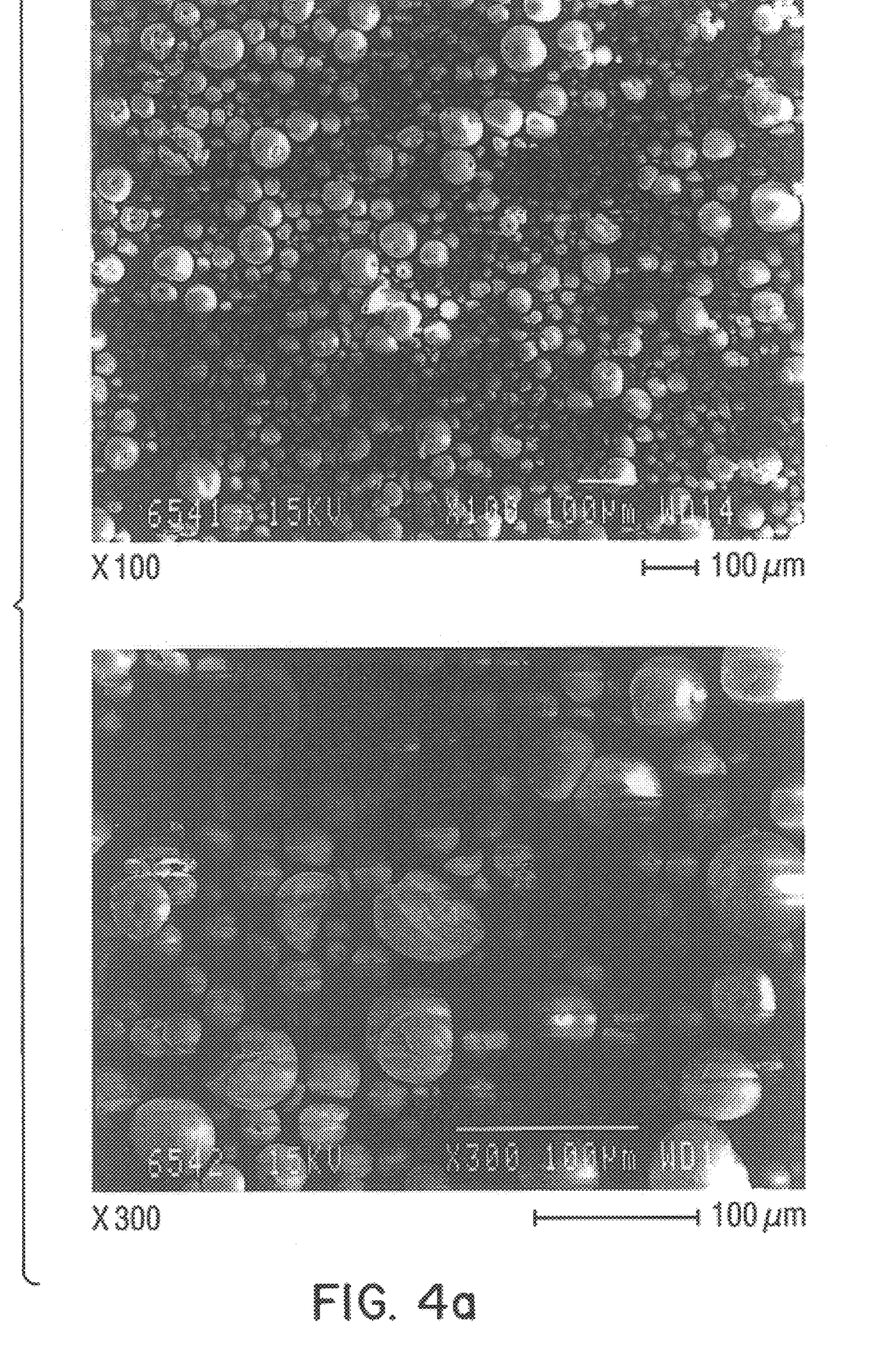
FIGS. 4a and 4b show the titanium silicalite-1 spray granulate in accordance with Example 5.
Figure 4B:
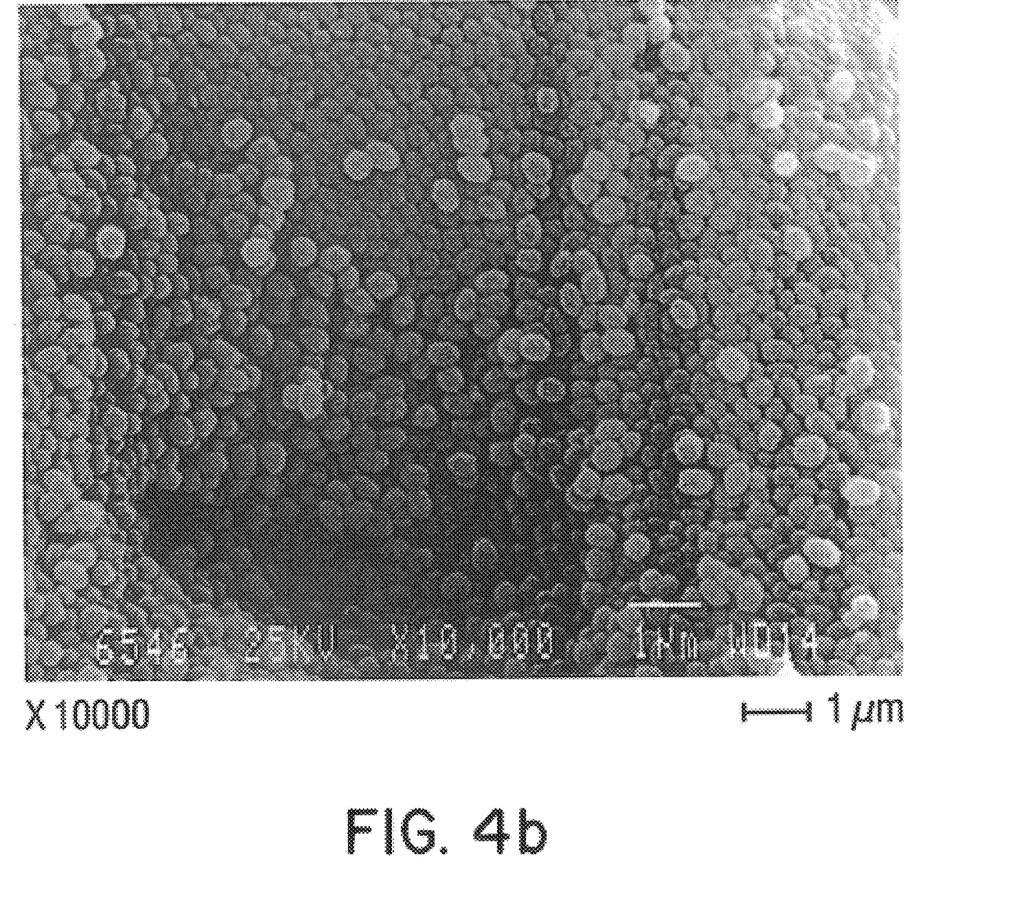
Figure 5:
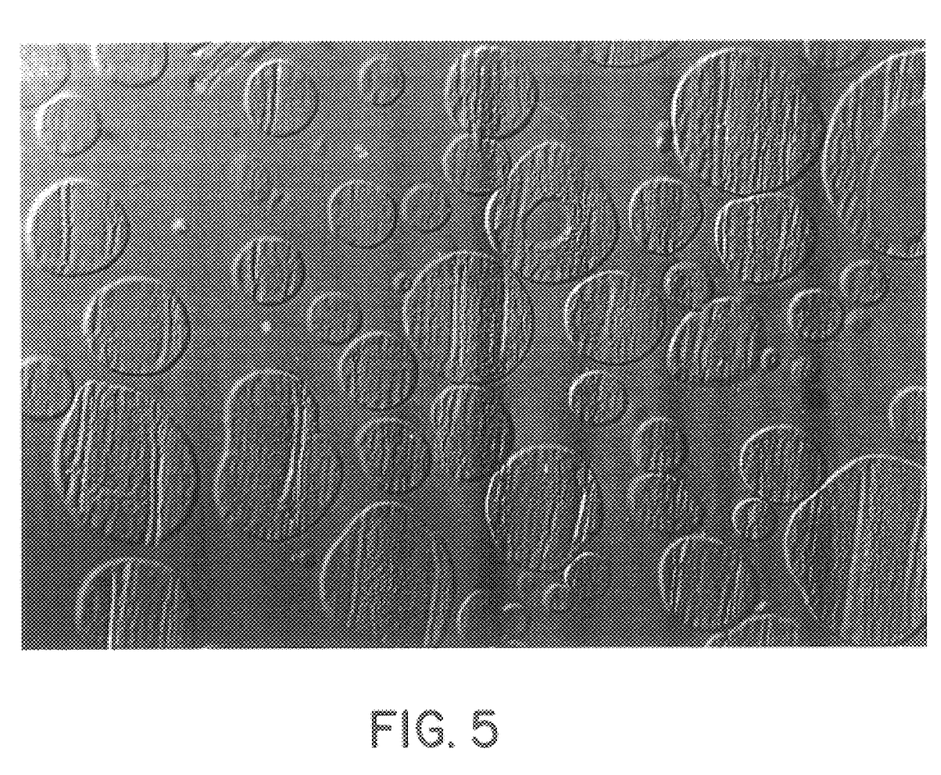
FIG. 5 shows a thin section photograph of the titanium silicalite-1 spray granulate in accordance with Example 5.

The scanning electron microscope photograph of the titanium silicalite-1 spray granulate (FIG. 4) shows that this consists of spherical, largely intact agglomerates with a diameter of 5 to 65 µm. At 10,000× magnification no amorphous layer can be detected on titanium silicalite-1 crystals with a diameter of about 0.3 µm. The thin section photograph (FIG. 5) also shows that the agglomerates are mainly dense.

Example 6
Application Example; the epoxidation of propylene with hydrogen peroxide Example 2 is repeated using the titanium silicalite-1 granulate prepared in accordance with Example 5. The activity index of the titanium silicalite-1 granulate is 29.0 min$^{-1}$, that of the unshaped titanium silicalite-1 powder 29.6 min$^{-1}$. The activity loss due to granulation is thus 2%.

Example 7
Preparation of a titanium silicalite-1 spray granulate using an enriched titanium silicalite-1 suspension 30 kg of a titanium silicalite-1 suspension prepared in the same way as in example 3 but on a 300 liter scale is flocculated by adding 105 g of flocculating agent PRAESTOL™ 187 K (Stockhausen Co., Krefeld). The solids are then separated by centrifuging. The still moist sediment is then suspended in 33 kg of the original suspension. The solids content of the suspension prepared in this way is determined in the same way as in Example 3 and is 182.5 g/l. The $SiO_2$ and $TiO_2$ concentration of the mother liquor filtered through a 0.2 µm membrane filter is 13.7 g/l of $SiO_2$ and 0.22 g/l of $TiO_2$.

The titanium silicalite-1 suspension prepared in this way is dried in a spray-drier (model Anhydro, type Lab. 3, APV Co.; air inlet temperature 440° C., volume flow of air 250 m$^3$/h, air outlet temperature 140° C., atomizing pressure 3.5 bar; two-fluid nozzle spraying system, fluid nozzle No. 100 105, air nozzle No. 200 278, 45°). A small sample of the product produced in this way is then calcined.

The chemical composition of the product obtained in this way is 96.9 wt. % $SiO_2$ and 3.1 wt. % $TiO_2$. The composition of the titanium silicalite-1 spray granulate prepared therefrom is calculated from the solids content and from the concentration of dissolved $SiO_2$ in the titanium silicalite-1 suspension used for spray-drying:

| | |
|---|---|
| concentration of titanium silicalite-1: | 92.9 wt. % |
| concentration of silicon dioxide: | 7.0 wt. % |
| concentration of titanium dioxide: | 0.1 wt. %. |

Figure 6A:
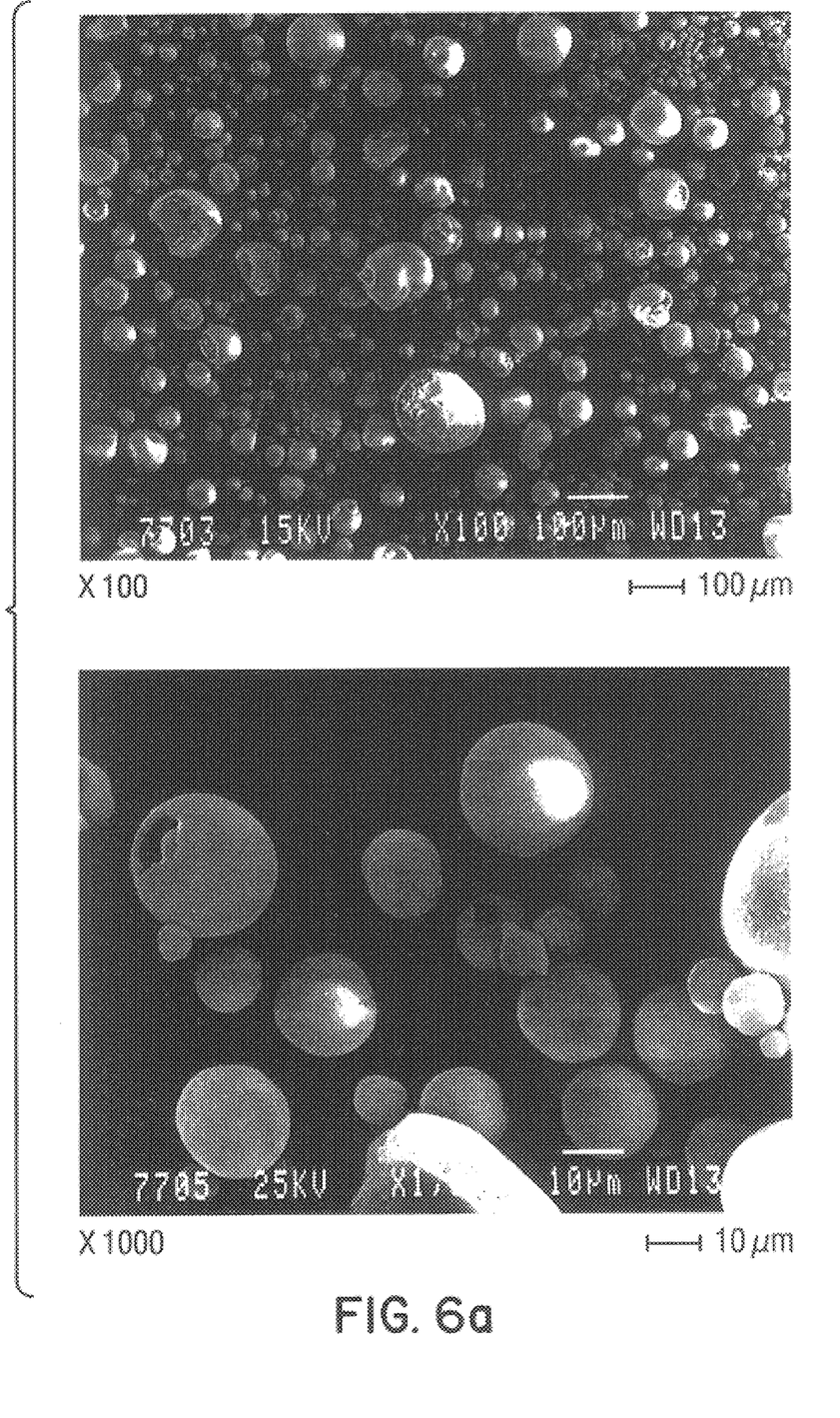
FIGS. 6a and 6b show the titanium silicalite-1 spray granulate in accordance with Example 7.
Figure 6B:
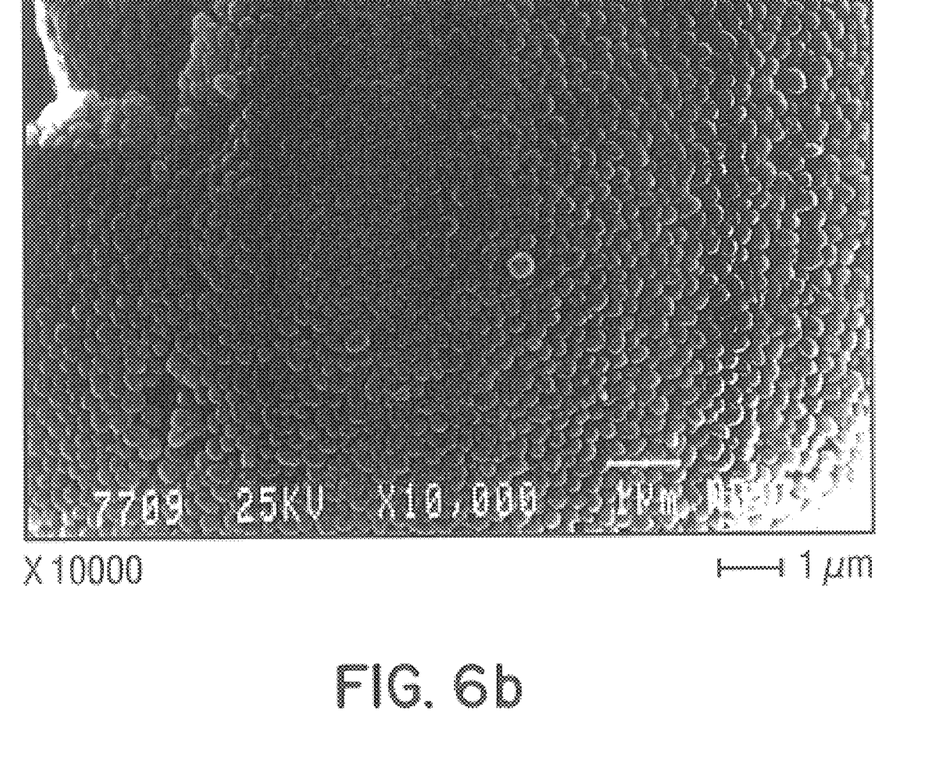

The scanning electron microscope photograph of the titanium silicalite-1 spray granulate (FIG. 6) shows that this consists of agglomerates with a diameter of 50 to 70 µm. At 10,000 × magnification it can be seen that primary crystals with a diameter of about 0.3 µm are coated with an amorphous layer.

Example 8
Application Example; the epoxidation of propylene with hydrogen peroxide Example 2 is repeated using the granulate prepared in Example 7. The activity index of the titanium silicalite-1 granulate is 24.2 min$^{-1}$; that of the unshaped titanium silicalite-1 powder is 26.9 min$^{-1}$. The activity loss due to granulation is thus 10.0%.

Example 9
Preparation of a titanium silicalite-1 fluidized-bed spray granulate 600 g of a titanium silicalite-1 granulate, milled to a d$_{50}$ value of 30 µm and with a titanium silicalite-1 content of 87.7 wt. %, a $SiO_2$ content of 11.3 wt. % and a $TiO_2$ content of 1.0 wt. % are initially placed in a laboratory fluidized-bed drier with an inflow area of 0.027 m$^2$. The solid is fluidized with nitrogen (inlet temperature 300° C., outlet temperature 120° C., volume flow during the course of granulation increasing from 30 to 37 standard cubic meters per hour). A titanium silicalite-1 suspension prepared as in Example 3 with a solids content of 111.6 g/l (with respect to the calcined material), a $SiO_2$ content of 12.8 g/l and a $TiO_2$ content of 0.70 g/l is sprayed onto the fluidized-bed from above using a two-fluid nozzle (Schlick mod. 970/0, nozzle size 0.8 mm, atomizing air pressure 1.8 bar, flow of suspension during the course of granulation increasing from about 15 to about 45 g/min). The batchwise operated fluidized-bed spray granulation procedure is performed until the weight of fluidized-bed is about 530 g. Losses of solids due to discharge from the fluidized-bed are not taken into account. The fluidized-bed spray granulate obtained is calcined at 550° C. for 2 hours in nitrogen and then for 2 hours in air.

The chemical composition of the product obtained in this way is 97.1 wt. % $SiO_2$ and 3.03 wt. % $TiO_2$. The composition of the outer layers on the TS-1 granulate prepared therefrom is calculated from the solids content and the concentration of dissolved $SiO_2$ in the titanium silicalite-1 suspension used for fluidized-bed spray granulation drying:

| | |
|---|---|
| concentration of titanium silicalite-1: | 89.2 wt. % |
| concentration of silicon dioxide: | 10.2 wt. % |
| concentration of titanium dioxide: | 0.6 wt. %. |

Example 10

Application Example; the epoxidation of propylene with hydrogen peroxide

Example 2 is repeated with the granulate prepared in Example 9. The activity index of the titanium silicalite-1 granulate is 19.4 min$^{-1}$; that of the unshaped titanium silicalite-1 powder is 19.9 min$^{-1}$. The activity loss due to granulation is thus 2.5%.

Example 11

Preparation of a titanium silicalite-1 fluidized-bed spray granulate

Some of the non-calcined titanium silicalite spray granulate prepared in accordance with Example 7 is classified by air separation and dry screening. 610 g of the fraction with a $d_{50}$ value of 45 μm are initially introduced into a laboratory fluidized-bed drier with an inflow area of 0.027 m$^2$. The solid is fluidized with air (inlet temperature 300° C., outlet temperature 120° C., volume flow during the course of granulation increasing from 32 to 41 standard cubic meters per hour). A titanium silicalite-1 suspension concentrated in the same way as in Example 7 is sprayed onto the fluidized-bed from above using a two-fluid nozzle (Schlick mod. 970/0, nozzle size 0.8 mm, atomizing air pressure 1.8 bar, flow of suspension during the course of granulation increasing from about 18 to 50 g/min). The fluidized-bed spray granulate obtained is calcined at 550° C. for 2 hours in nitrogen and then for 2 hours in air. The composition of the titanium silicalite-1 granulate obtained therefrom is calculated from the solids content and from the concentration of dissolved $SiO_2$ in the titanium silicalite-1 suspension used for spray-drying:

| | |
|---|---|
| concentration of titanium silicalite-1: | 92.9 wt. % |
| concentration of silicon dioxide: | 7.0 wt. % |
| concentration of titanium dioxide: | 0.1 wt. %. |

Example 12

Example of the Invention; epoxidation of propylene with hydrogen peroxide

Example 2 is repeated with the granulate prepared in Example 11. The activity index of the titanium silicalite-1 granulate is 23.9 min$^{-1}$, that of the unshaped titanium silicalite-1 powder 26.9 min$^{-1}$. The activity loss due to granulation is thus 11%.

What is claimed is:

1. Granulates which contain titanium silicalite-1, comprising titanium silicalite-1 crystals, silicon dioxide and titanium dioxide, obtained from a suspension of titanium silicalite-1 crystals, silicon dioxide and titanium dioxide, wherein the silicon dioxide and titanium dioxide act as a binder between the titanium silicalite-1 crystals of the granulates.

2. Granulates which contain titanium silicalite-1 according to claim 1, wherein the silicon dioxide is present in an amount of 1 to 50 wt. % and the titanium dioxide is present in an amount of 0.01 to 5 wt. %.

3. Granulates which contain titanium silicalite-1 according to claim 1, that are prepared by spray-drying.

4. Granulates which contain titanium silicalite-1 according to claim 1, that are prepared by fluidized-bed spray granulation drying.

5. Granulates which contain titanium silicalite-1 according to claim 4, comprising solids having a core and an outer layer.

6. Granulates which contain titanium silicalite-1 according to claim 5, wherein at least one member selected from the core and the outer layer comprises titanium silicalite-1.

7. Granulates which contain titanium silicalite-1 according to claim 5, wherein the core consists of at least one material selected from the group consisting of $SiO_2$, $Al_2O_3$, $TiO_2$, $ZrO_2$, mixed oxides thereof, aluminas, natural silicates and zeolites.

8. Granulates according to claim 7, wherein the zeolites are selected from the group consisting of ZSM-5 and de-aluminized y-zeolite.

9. Granulates which contain titanium silicalite-1 according to claim 5, wherein the core comprises spray-dried and milled titanium silicalite-1 granulate.

10. A process for preparing titanium silicalite-1 granulates according to claim 1 comprising:

crystallizing a synthesis gel comprising a $SiO_2$ source, a $TiO_2$ source, a compound containing tetra-n-propylammonium ions, a base and water under hydrothermal conditions, thereby producing a titanium silicalite-1 suspension;

optionally concentrating the suspension;

optionally adding further substances;

drying by a step selected from spray-drying and fluidized-bed spray granulation drying; and calcining the titanium silicalite-1 granulate so formed at a temperature of 400° to 1000° C.

11. A process according to claim 10, comprising calcining at a temperature of 500° to 700° C.

12. A process for using the granulates according to claim 1, comprising adding the titanium silicalite-1 to an organic reaction mixture as a catalyst.

13. A process according to claim 12, comprising epoxidation of olefins with hydrogen peroxide.

14. A process according to claim 12, comprising hydroxylation of aromatic compounds with hydrogen peroxide.

15. A process according to claim 12, comprising ammoximation of carbonyl compounds with ammonia and hydrogen peroxide.

16. A process according to claim 12, comprising oxidation of secondary alcohols to ketones with hydrogen peroxide.

* * * * *